*INVENTORS*
*MORRIS SCHWARTZ*
BY *WILLIAM CASTEDELLO*

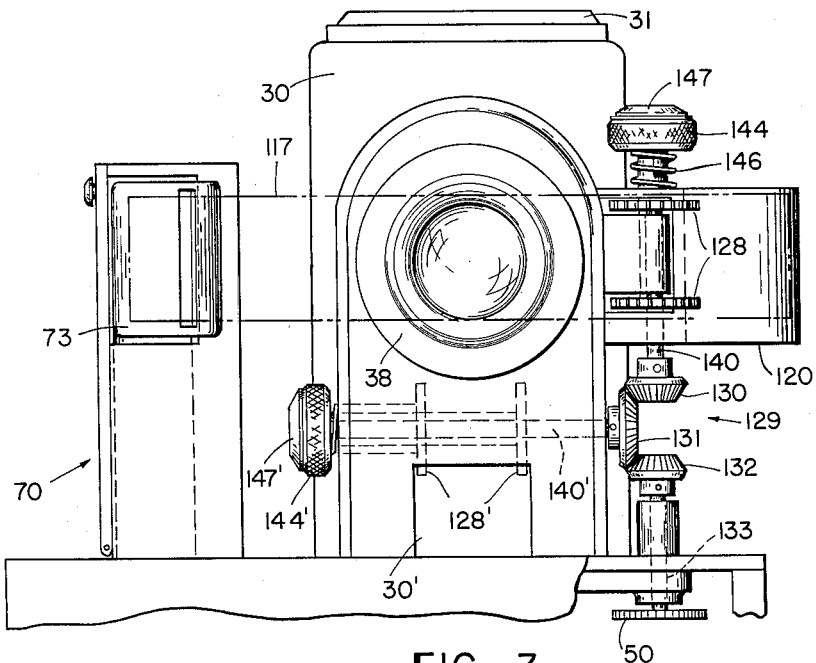
FIG. 3
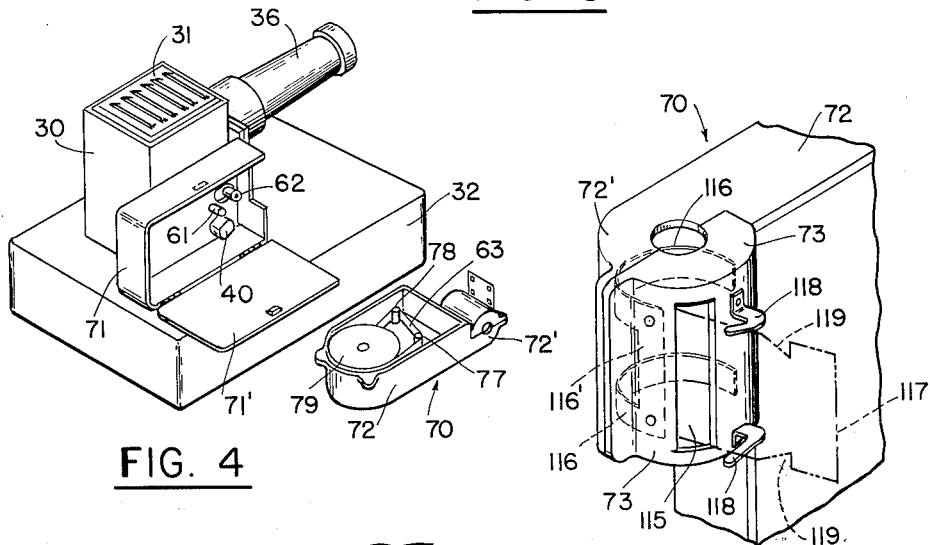
FIG. 4
FIG. 5
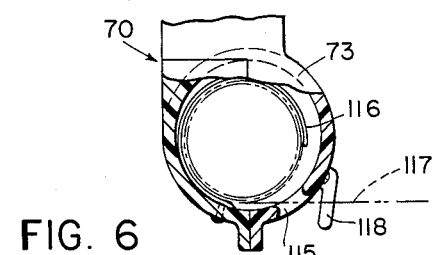
FIG. 6
INVENTORS
MORRIS SCHWARTZ
WILLIAM CASTEDELLO
BY
ATTORNEYS May 8, 1962 M. SCHWARTZ ET AL 3,033,077
SOUND PROJECTOR
Filed March 26, 1958 8 Sheets-Sheet 4

ATTORNEYS

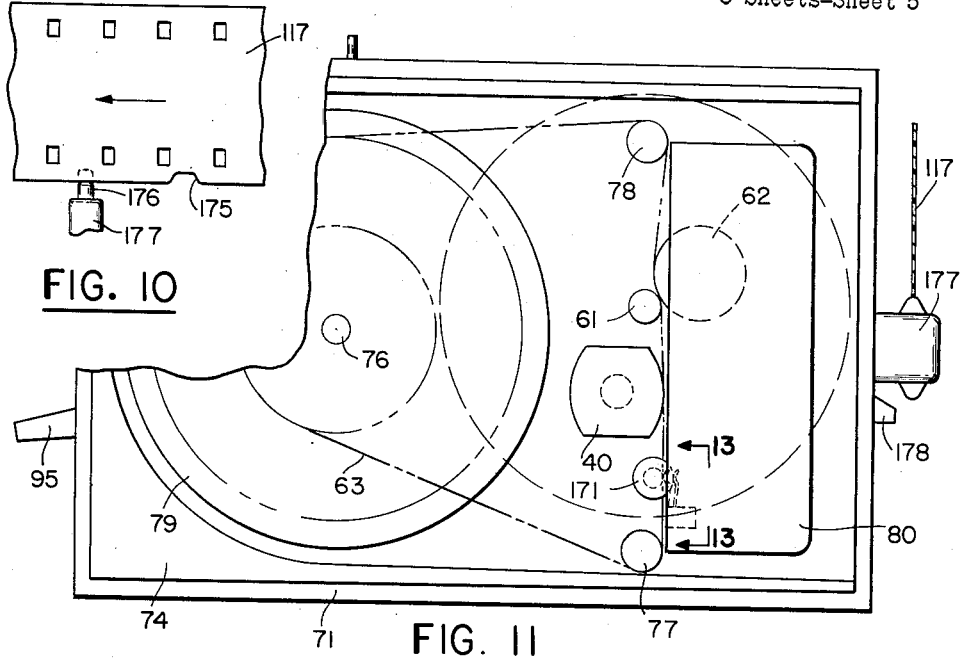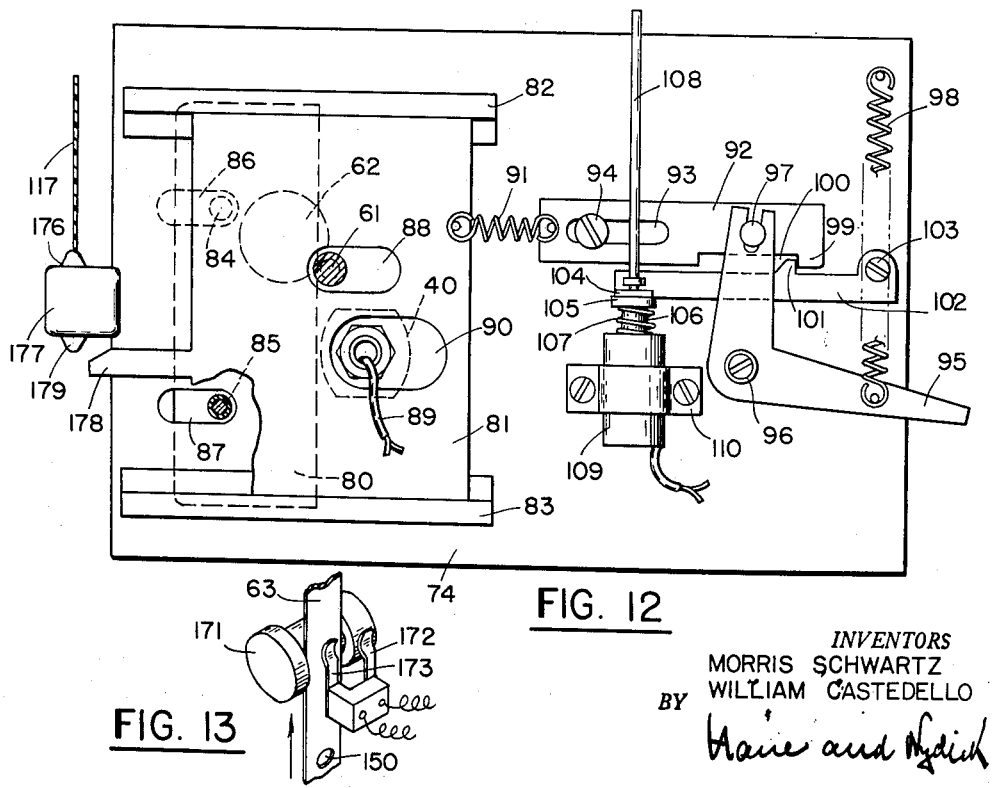

May 8, 1962  M. SCHWARTZ ET AL  3,033,077
SOUND PROJECTOR
Filed March 26, 1958  8 Sheets-Sheet 6
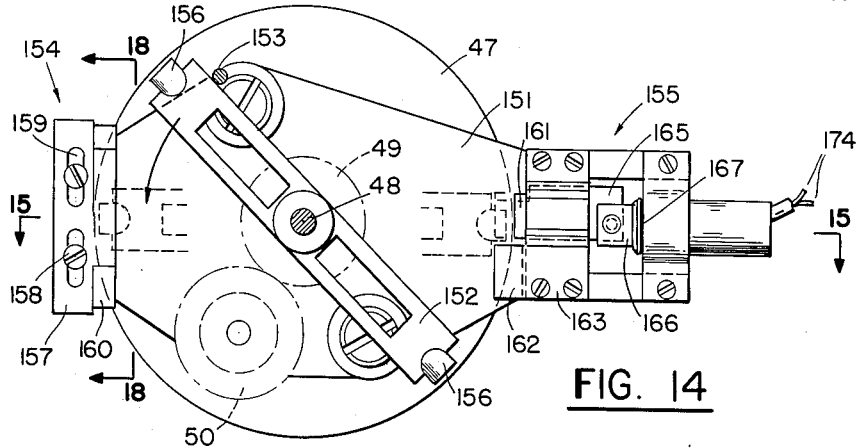
FIG. 14
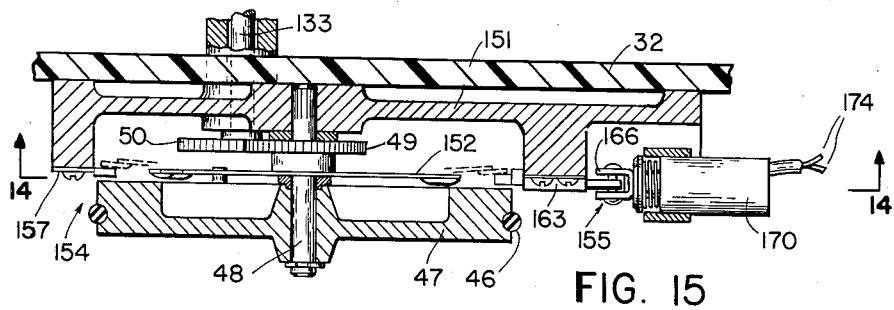
FIG. 15
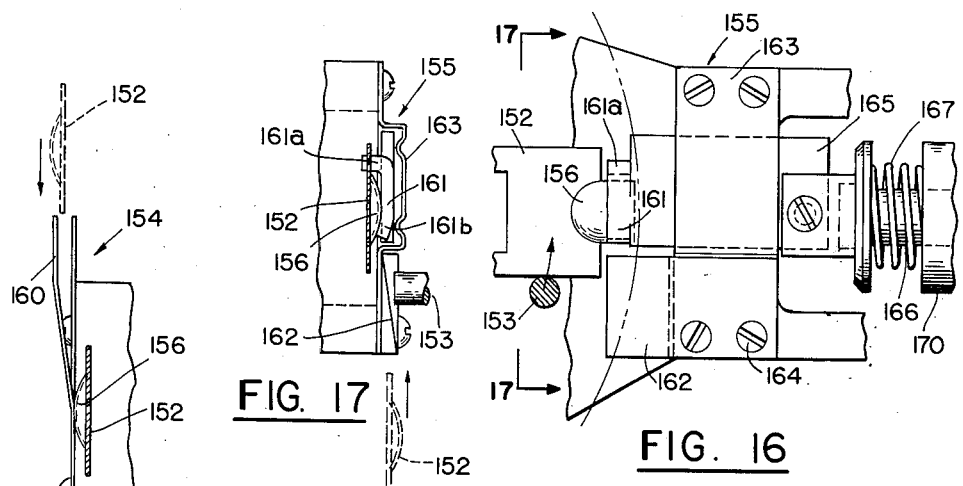
FIG. 17
FIG. 18
FIG. 16
*INVENTORS*
MORRIS SCHWARTZ
WILLIAM CASTEDELLO
BY
*ATTORNEYS*

May 8, 1962    M. SCHWARTZ ET AL    3,033,077
SOUND PROJECTOR
Filed March 26, 1958                    8 Sheets-Sheet 7
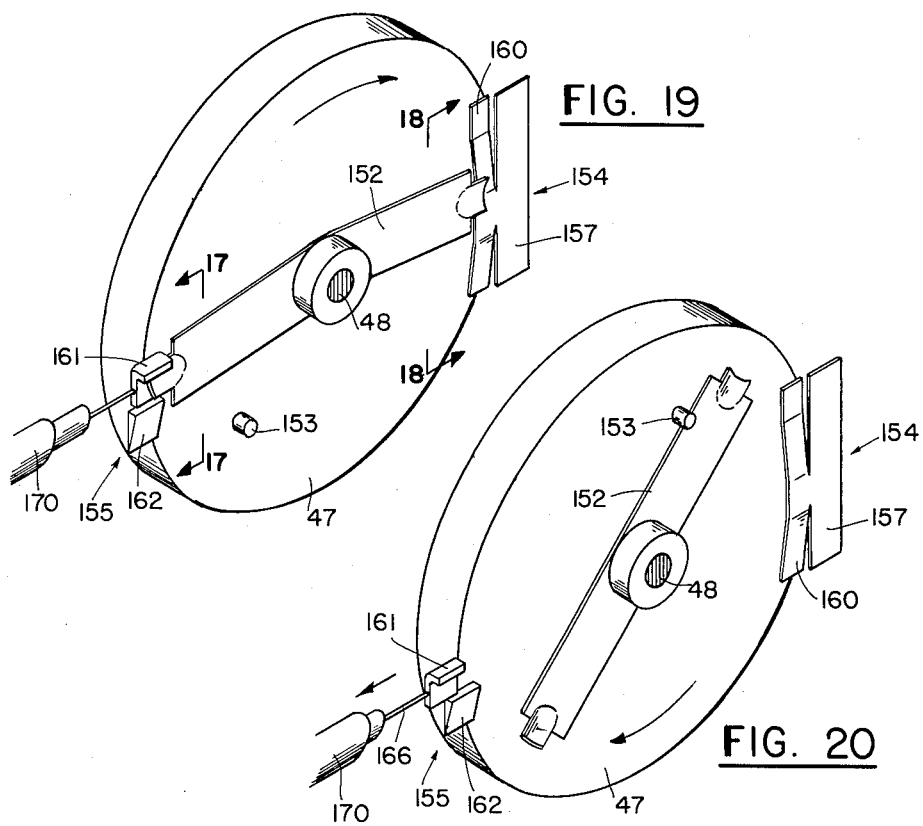
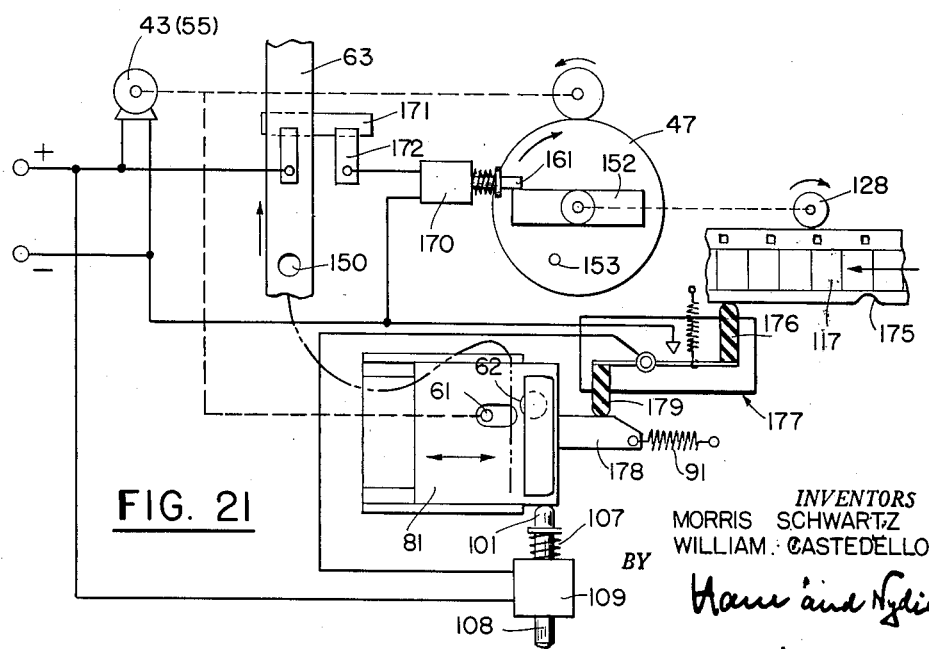
INVENTORS
MORRIS SCHWARTZ
WILLIAM CASTEDELLO
BY
ATTORNEYS May 8, 1962   M. SCHWARTZ ET AL   3,033,077
SOUND PROJECTOR
Filed March 26, 1958   8 Sheets-Sheet 8

INVENTORS
MORRIS SCHWARTZ
WILLIAM CASTEDELLO
BY
ATTORNEYS

United States Patent Office 3,033,077
Patented May 8, 1962

3,033,077
SOUND PROJECTOR
Morris Schwartz and William Castedello, Plainville, Conn., assignors to The Kalart Company Inc., Plainville, Conn
Filed Mar. 26, 1958, Ser. No. 724,064
8 Claims. (Cl. 88—28)

The present invention relates to a sound projector for projecting successive still photographs especially on strip film and simultaneously reproducing a recorded message pertaining to said photographs.

While a projected still photograph, as any picture, is to a certain extent self-explanatory, additional information or comment pertaining to the picture is often necessary, or at least desirable. This is not only true for still photographs of a technical, scientific or promotional nature, but also for pictures of more personal interest. The enjoyment of viewing pictures and the useful information derived therefrom will often be greatly increased by an accompanying comment on the nature of the subject depicted on the picture.

One of the objects of the present invention is to provide a novel and improved apparatus of the general kind above referred to, which permits the projection of successive pictures and the simultaneous reproduction of an audible message associated therewith at greater convenience than heretofore possible.

Another object of the invention is to provide a novel and improved sound projector in which the picture projecting equipment and the sound reproducing equipment are incorporated in a compact self-contained structure. Such a structure affords the advantage that it requires a minimum of space and is ready for operation without preliminary setting-up and interconnection of structural separate components as heretofore frequently used for apparatus of the kind here involved.

Another object of the invention is to provide a novel and improved sound projector in which each picture and the specific part of the message pertaining thereto are positively corelated and successive pictures and message parts are automatically projected and reproduced respectively in the correct sequence and correctly timed in relation to each other.

Another object of the invention is to provide a novel and improved sound projector in which the cartridges for a strip film bearing the pictures to be projected and a sound track tape carrying the recorded message are combined in a self-contained structural unit that can be inserted in and detached from the main body of the projector. Such positive correlation of the film and the sound track carrier pertaining thereto affords that advantage that any danger of a confusion of pictures and associated message on the part of the operator is eliminated. It affords the further advantage that one presentation can be rapidly and conveniently exchanged for another.

Still another object of the invention, allied with the next preceding one, is to provide a novel and improved sound projector which employs as message carrier a record tape preferably an endless tape, disposed in said cartridge constituting part of the detachable structural unit. The use of a separate record tape instead of a sound track, either optical or magnetic, directly on the strip film permits a wide latitude as to the length of message associated with each picture and a convenient association of different messages, for instance messages in foreign languages, with a given picture. The use of tape in the form of an endless loop obviates also the necessity of rewinding the tape at the end of each presentation.

A further object of the invention is to provide as carrier for the strip film a novel and improved cartridge in which the surface of the film is protected against scuffing and which prevents the film end from slipping completely into the cartridge when the film is rewound or first inserted, thereby facilitating readying of the projector for a new presentation.

A still further object of the invention is to provide a novel and improved sound projector including means to prevent restarting of the projector at the end of a presentation until the strip film just projected is rewound.

Yet another object of the invention is to provide a novel and improved sound projector which includes means for conveniently centering each picture to be projected in front of a picture gate without affecting the correlation between the pictures and the associated parts of the message.

It is also an object of the invention to provide a novel and improved sound projector which includes mounting and supporting means for accurately and conveniently adjusting the position of the projector proper as to height in relation to the base upon which it is placed.

Other and further objects, features and advantages of the invention will be pointed out hereinafter and set forth in the appended claims forming part of the application.

In the accompanying drawing, a preferred embodiment of the invention is shown by way of illustration and not by way of limitation.

In the drawing:

FIG. 3 is a front view, partly in section, of the projector, some of the parts being omitted.

FIG. 4 is a perspective view of the projector according to FIGS. 1, 2 and 3 and of the structural unit combining the film supply cartridge and the record tape cartridge.

FIG. 5 is a perspective view of the film cartridge part of the unit on an enlarged scale.

FIG. 6 is a plan view of FIG. 5, partly in section.

FIG. 10 is a view of a portion of the strip film and a partial view of the control means for automatically stopping the tape drive means at the end of the presentation.

FIG. 11 is a view similar to FIG. 7, but showing the tape drive means in the tape driving position.

FIG. 12 is a view similar to FIG. 8 but showing the actuating means for the tape drive means in the operated position.

FIG. 13 is a view similar to FIG. 9 but showing the same part of the film transport control means in the position which it occupies when the tape drive means are operated.

FIG. 14 is a plan view of another part of the film transport control means.

FIG. 15 is a section taken on line 15—15 of FIG. 14.

FIG. 16 is an enlarged detail view of the right side of FIG. 14.

FIG. 17 is a section taken on line 17—17 of FIG. 16.

FIG. 18 is a section taken on line 18—18 of FIG. 14 on an enlarged scale.

FIG. 19 is a simplified diagrammatic view of the control means of FIGS. 14 and 15 in one position.

FIG. 20 is a similar view in another position.

FIG. 21 is a schematic diagram of the sound projector and the circuit connections therefor.

Figure 1:
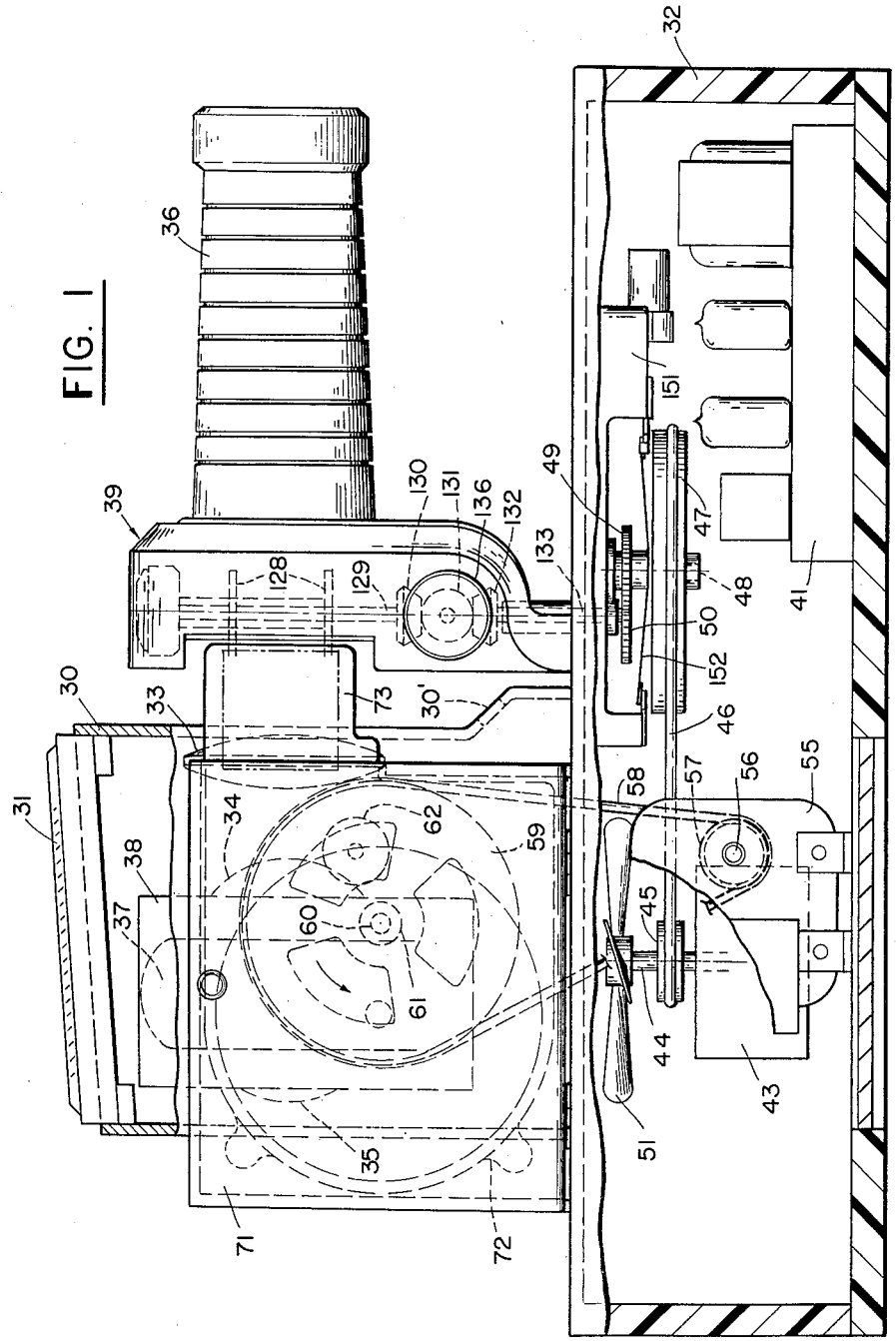
FIG. 1 is an elevational side view, partly in section, of a sound projector according to the invention.
Figure 2:
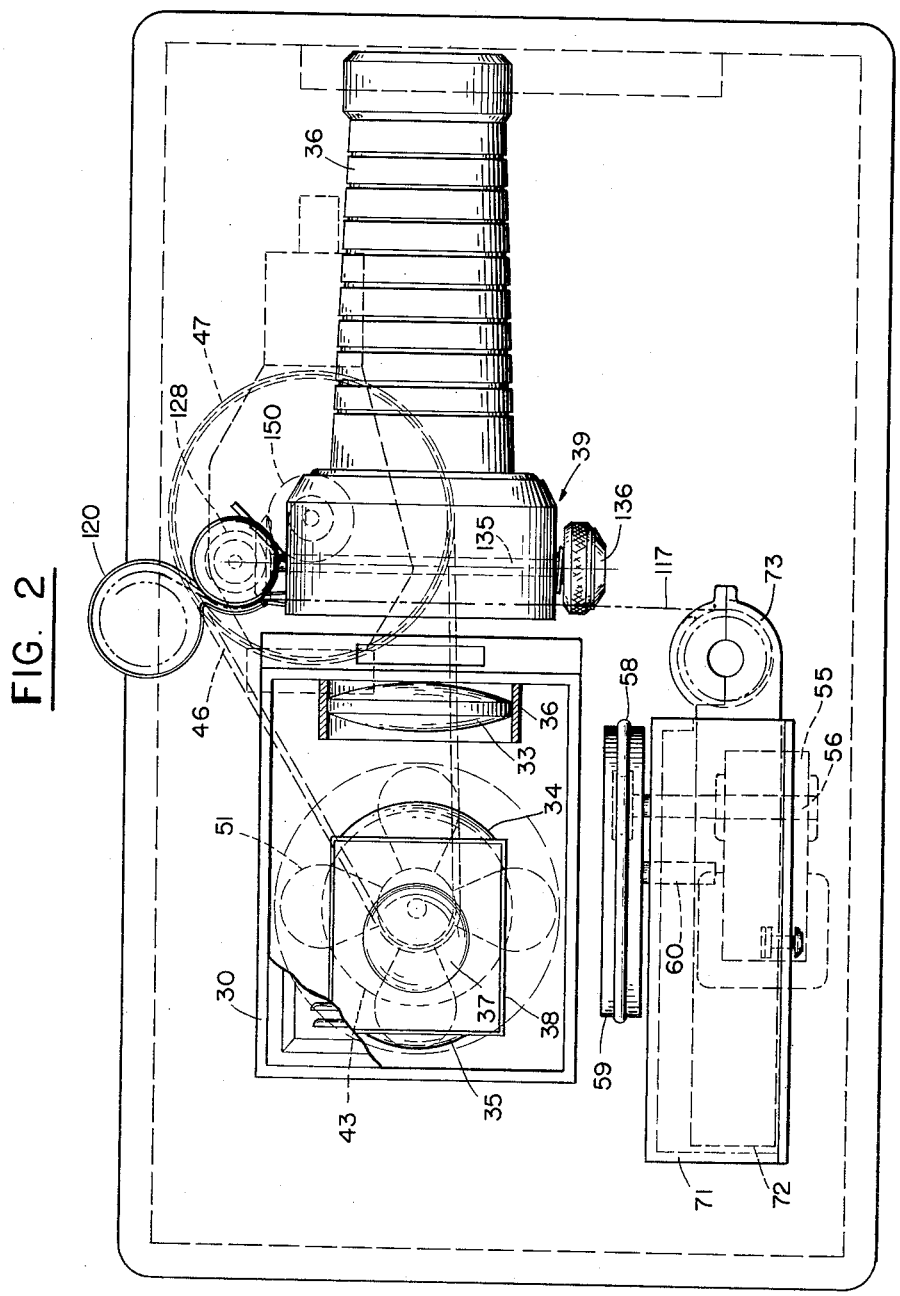
FIG. 2 is a plan view, also partly in section, of a projector according to FIG. 1.

Referring now to the figures in detail; the sound projector as exemplified in the figures comprises the standard components of such a projector, namely projecting means, sound reproducing means, film transport means, drive means for the record tape and attendant control components. All the parts of the projector are mounted in a common casing or frame structure 30 which in turn is mounted on a suitable base. This base is also used to house some of the operating equipment of the projector as will be more fully described hereinafter. The overall appearance of the sound projector and its base can best be seen in FIG. 4 although it should be understood that the configuration of the casing and the base as shown in this figure is intended to be illustrative rather than to show the actual configuration of a marketable product.

Frame structure or housing 30 is shown, by way of illustration only, to be of generally rectangular shape. It is closed at the top by a louvered cover 31 and is mounted on a base 32. A cooling vent 30' is provided in the front face of the housing.

The film projecting means comprise a suitable lens system of which are shown lens elements 33, 34 and 35. Further lens elements should be visualized as being mounted in a barrel 36. The optical data of the lens system and the focussing of the lens system are not essential for the understanding of the invention and are hence not described in detail. Light is supplied to the projecting means by a projection lamp 37 also of conventional design placed in a chimney-like housing 38. The strip film to be projected is guided past a film gate by means of a film guide and transport generally designated by 39 which will be more fully described hereinafter.

The record tape should be visualized as a magnetic tape and accordingly the signals are picked up from this tape by means of a magnetic head 40 of conventional design. The signals picked up by the magnetic head are fed to a conventional amplifier 41 and from the amplifier to a loudspeaker (not shown) in a manner well known in the art. The amplifier is housed in the casing-like base 32 and the loudspeaker may be mounted in the top cover thereof.

The drive for the film is derived from a suitable motor 43, the shaft 44 of which mounts a pulley 45 which drives over a belt 46 a fly wheel 47. The shaft of this wheel seats a loose gear 49 which is in mesh with a second gear 50. Gear 50 constitutes part of the film guide and transport means 39 more fully explained hereinafter. It need only be mentioned in this connection that the ratio of transmission between motor shaft 44 and gear 50 are selected so that the requisite reduced rate of speed is obtained at gear 50.

Motor shaft 44 further seats a fan 51 which serves to dissipate the heat generated by the projection lamp 37. The drive for the record tape is derived from a second motor 55, the shaft 56 of which mounts a pulley 57 which over a belt drive 58 drives a fly wheel 59. This fly wheel is seated on a shaft 60 which also seats a capstan 61. The capstan coacts with an idler 62 which when moved into driving coaction with the capstan drives the record tape 63 guided between the capstan and the idler.

*The Cassette for Inserting Tape and Film in the Projector*

As has been previously explained, one of the essential features of the invention is to assure that a strip film including a certain sequence of pictures and the tape carrying the message pertaining thereto can be conveniently maintained to gether so as to preclude for all practical purposes any danger of confusion by associating the wrong audible message with a visual message. To accomplish this essential object, a carrier for the record tape and a carrier for the supply of film are united in a structure which can be attached to and removed from the main structure of the projector only as a unit.

FIG. 4 shows the projector ready to receive a unit which is shown as a cassette 70 in an open housing 71 secured to the frame 30 of the projector. The housing is shown generally rectangular and the capstan 61 and the magnetic sound head 40 extend into the housing through the bottom plate 74 thereof. The housing may be closed by a door 71' after insertion of the cassette. The cassette comprises an open casing 72 made of metal or plastic, in which is fitted a tape spool or cartridge 79 from the middle of which an endless loop of tape 63 is fed out and into which it is returned near the periphery of the cartridge in a manner well known for cartridges of this kind. The tape loop is guided over the two idlers 77 and 78 between capstan 61 and idler 62 and past sound head 40 and the film cartridge will protrude through a cut-out in the respective wall of housing 71. As a result, all the components of the cassette are automatically located in the correct position for coaction with the respective components mounted on or in the projector. Closing of door 71' will secure the cassette in position. Exchange of the cassette is effected in an equally simple manner by withdrawing the cassette from the housing.

The film is withdrawn from cartridge 72', 73 through a longitudinal slot 115 thereof. To avoid scuffing the rather sensitive surface of the film, one or several springy fingers 116 are secured by rivets or other suitable means to the inside wall of the cartridge. Two circumferentially curved fingers joined by a strip 116' are shown. As can best be seen in FIG. 6 the fingers hold the supply of film 117 substantially floating within the cartridge. To protect the film and to facilitate withdrawal of the beginning of the film from the cartridge for insertion in the projecting means, lugs 118 are preferably provided, which lugs are engageable with notches 119 at the beginning of the film, that is, near the outer end thereof. These lugs when engaging the notches retain the end of the film protruding from the cartridge slot thereby preventing the film from slipping entirely into the cartridge.

The film may be guided and transported past the projecting means in the projector either horizontally or vertically. To simplify illustration, only the horizontal film guide and transport means are shown in full and will now be described in detail.

*Tape Drive Control*

The control of the tape drive will be explained in connection with FIGS. 7, 8, 11 and 12. For sake of simplicity of illustration, it is assumed that in FIGS. 7 and 11 the cassette is inserted, but the base plate of casing 72 is removed.

Figure 7:
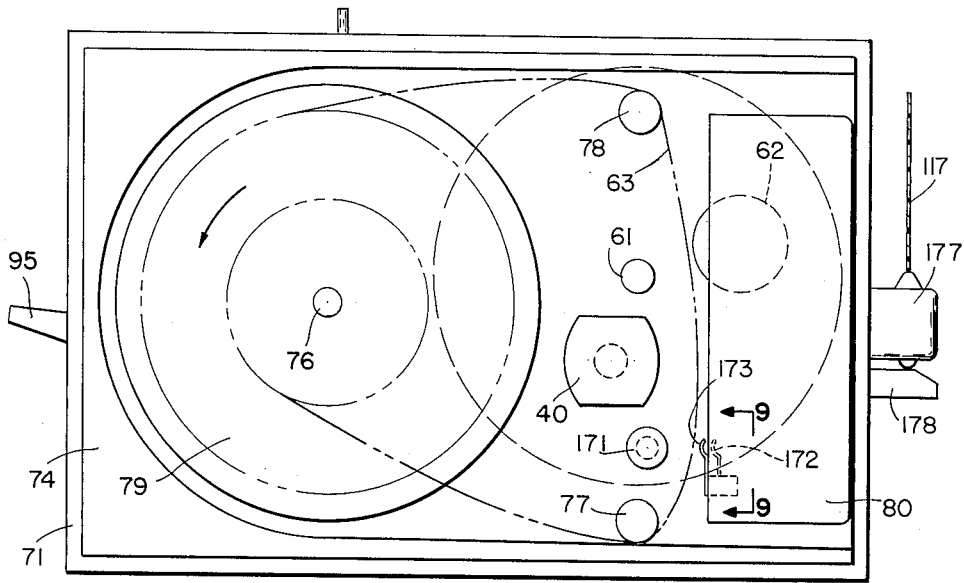
FIG. 7 is an elevational view of the tape cartridge, the tape drive means and part of the film transport control means controlled by the tape position, the tape drive means being shown in the tape stopping position.

FIG. 7 shows idler 62 separated from the capstan 61, that is, in its non-driving position. The loop of the record tape accordingly is slack. FIG. 11 shows idler 62 closely adjacent to the capstan, that is, in its driving position. Accordingly, the tape loop is taut and the record tape will be driven by the capstan past magnetic sound head 40. The mechanism for moving idler 62 from the position of FIG. 7 into the position of FIG. 11 is shown in FIGS. 8 and 12 in the corresponding positions.

In FIGS. 7 and 11, the loop of tape 63 protruding from the tape cartridge 79 is guided over idlers 77 and 78 and passes between capstan 61 and idler 62. This idler is rotatably mounted in an open housing 80 which is situated on the side of housing plate 74 facing the tape cartridge. Housing 80 can be displaced on base plate 74 parallel thereto and toward capstan 61 thereby moving idler 62 from the position of FIG. 7 into the driving position of FIG. 11. The mechanism for effecting and controlling such displacement of housing 80 is disposed on the side of plate 74 opposite to that facing the tape cartridge.

Figure 8:
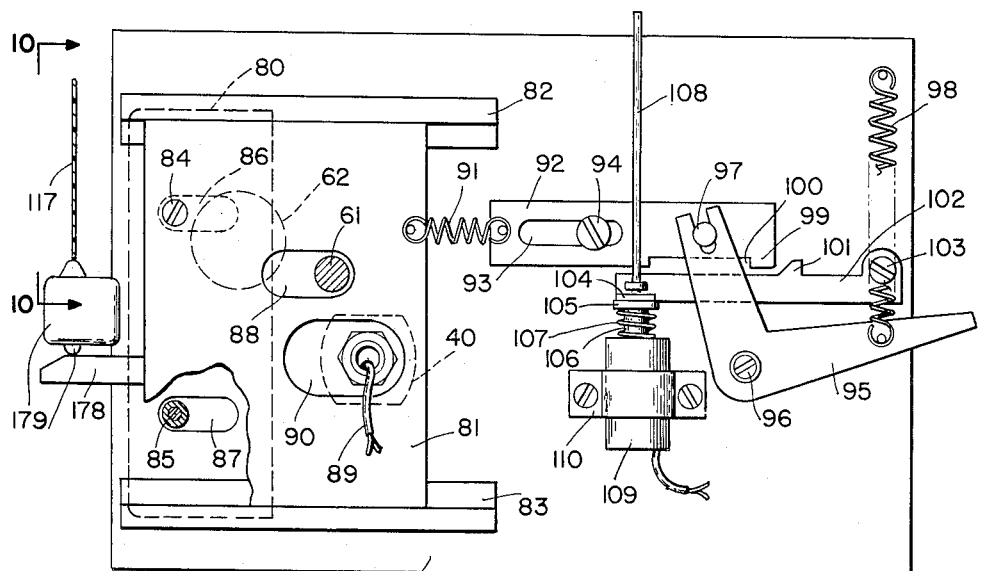
FIG. 8 is an elevational rear view of FIG. 7 showing the actuating means for moving the tape drive means into the tape driving position, said actuating means being shown in the non-operated position.

The mechanism which is shown in detail in FIGS. 8 and 12 comprises a guide plate 81 which is slidable in guide tracks 82 and 83 suitably secured to plate 74. Housing 80 is fastened to guide plate 81 by suitable means such as screws or pins 84 and 85 extending through longitudinally elongated slots 86 and 87 in plate 81 to permit a displacement of plate 81 and with it of housing 80 relative to base plate 74. Similarly and for the same purpose, capstan 61 extends through an elongated slot 88 in plate 81 and the connection wire 89 for magnetic head 40 extends through an elongated slot 90 through plate 81. As is apparent, plate 81 can be displaced in its guide tracks in either longitudinal direction within the required limits without being blocked by the components disposed on the opposite side of base plate 74. Guide plate 81 is linked by means of a spring 91 to a link 92 which in turn is longitudinally slidable on base plate 74 by means of a longitudinal slot 93 and a guide pin or screw 94 extending through the slot into base plate 74. Link 92 is engaged by an actuating member shown as a bell crank lever 95 pivotal about a pivot screw 96 threaded into base plate 74. One arm of this lever is bifurcated and engages a lug 97 on link 92. As is evident, a pivotal movement of lever 95 from the position of FIG. 8 into the position of FIG. 12 will move plate 81 and housing 80 and with it idler 62 into the position in which the idler is in driving engagement with the capstan. A loaded coil spring 98 secured at one end to plate 74 and at the other end to the second arm of lever 95 seeks to pull the latter into the position of FIG. 8, or in other words, to move the entire mechanism into the position in which idler 62 is in its non-driving position.

To retain link 92 in the operated position of FIG. 12 against the action of spring 98, releasable locking means are provided coacting with the lever. These locking means are shown as a lug 99 formed in one longitudinal edge of link 92 by a cut-out 100. Of course, lug 99 may also extend directly from the respective edge of the link. Lug 99 coacts with a nose 101 on an arm 102 pivotal about a pivot screw or pin 103 secured to base plate 74. The free end of arm 102 has a lateral lip 174 which rests upon the head 105 of a rod 106 slidable transversely of the arm 102. A spring 107 seeks to pivot arm 102 toward link 92. When nose 101 is so positioned that it occupies a position clear of link 92 when the latter is in the position of FIG. 8, but enters cut-out 100 when the link is in the position of FIG. 12 thereby locking link 92. As is apparent, spring 107 permits nose 101 to pass lug 99 when and while link 92 is moved into the position of FIG. 12.

Release link 92 can be manually operated or automatically controlled by the energization of a solenoid 109 which in turn is controlled by the movement of the tape.

Manual control can be effected by acting upon arm 102 by means of a rod 108, which coacts directly with lip 104 to depress arm 102 against the action of spring 107.

To effect the automatic control of the release means, rod 106 constitutes the movable core for the solenoid 109 secured to base plate 74 by any suitable means such as a strap 110. Energization of the solenoid will effect release of arm 102 in the same manner as a depression of rod 108.

Figure 22:
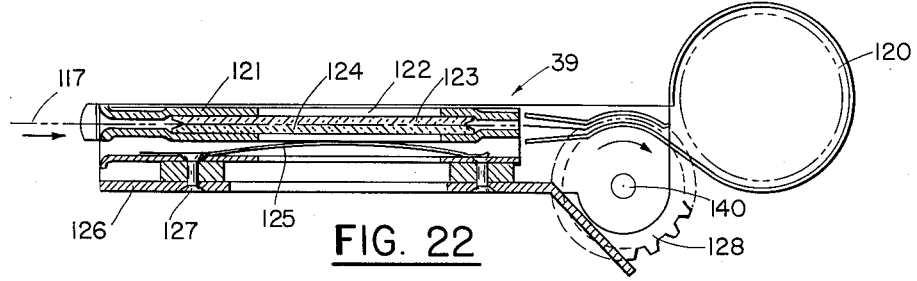
FIG. 22 is a sectional view on an enlarged scale of the film guide of the projector and a take-up cartridge for the film.

Turning to FIG. 22, the film coming from supply cartridge 72', 73 is fed to a take-up cartridge 120 which may be of similar design as the supply cartridge, but of course without having lugs 118. The film on its travel to cartridge 120 is guided through the film guide and transport assembly 39 fitted in an appropriate slot in the projector casing. The film guide means proper include a metal frame 121 suitably secured within the projector casing and including a film gate 122. Frame 121 has attached thereto a transparent plate 123 and the film is guided between this plate and a second transparent plate 124. The second plate is yieldably pressed against plate 123 by a flexed leaf spring 125 which in turn is secured to a metal frame 126 by any suitable means such as rivets 127. Frame 126 is also suitably mounted within the projector.

The film after emerging from the film guide is guided over one or two sprocket gears 128 depending upon whether the film has one row of sprocket holes or two rows as shown in FIG. 10. The sprocket gears are seated on a drive 129 including a bevel gear 130. Gear 130 is in mesh with a bevel gear 131 which in turn is in mesh with a third bevel gear 132. Gear 132 is seated on a drive shaft 133 which in turn seats gear 50. As is apparent rotation of gear 50 will be transmitted to sprocket gear 128 thereby effecting transport of the film.

Figure 23:
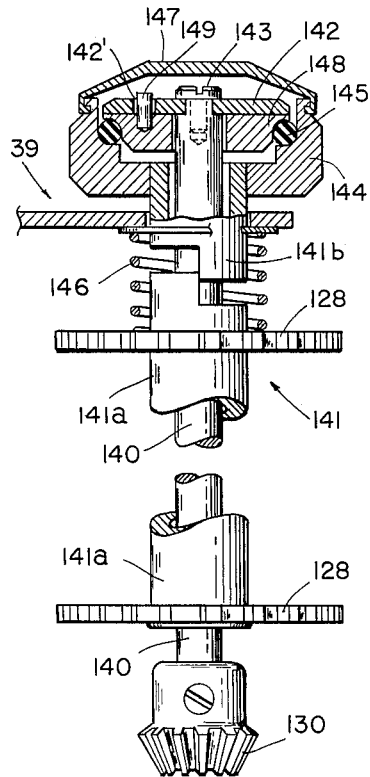
FIG. 23 is an enlarged detail view of FIG. 3 showing a setting device for adjusting a picture area in front of the film gate of the guide.

The fine adjustment of the film in relation to the film gates can be conveniently effected by means of the structure according to FIG. 23. In actual practice only the first picture on the film may need to be adjusted. The other pictures will be automatically correctly correlated.

According to FIG. 23, bevel gear 130 is secured to a drive shaft 140 which is seated in a hollow drive shaft 141. Drive shaft 141 is divided in two parts 141a and 141b, which engage each other in driving engagement by shoulders or claws. Inner shaft 140 has secured at its end opposite to gear 130 a disc 142 by any suitable means such as a screw 143. Disc 142 is drivingly connected to a generally disc-shaped coupling member 148 by means of a pin 149 protruding from member 148 and engaging with play a hole 142' in disc 142. The hole may be slightly radially elongated to provide the required clearance. Coupling member 148 is seated also with play or clearance on shaft 140, and nested in a second coupling member 144 in the form of a shallow cup. Coupling member 144 is secured to section 141b of drive shaft 141 while sprocket gears 128 are secured to section 141a for rotation in unison with the respective shaft sections. A coupling ring 145 of suitable high friction material such as rubber is interposed between the facing surfaces of coupling members 148 and 144. A spring 146 urges coupling member 144 toward coupling member 148 thereby effecting a rotation transmitting frictional pressure between the coupling members and friction ring 145. An ornamental cap 147 covers inner coupling member 142 and is fixedly secured to coupling member 144 by any suitable means such as an inwardly turned flange. Due to the play between disc 142 and coupling member 148 and between shaft 140 and coupling member 148, these parts can slightly wobble relative to each other, whereby any irregularities in the dimensions of ring 145 are readily compensated for. When all the components are in the position shown in FIG. 23, a rotation of gear 130 will be transmitted to sprocket gears 128 through shaft 140, coupling member 142, coupling ring 145, coupling member 144, shaft section 141b and shaft section 141a. In the event that it is desired to rotate sprockets 128 independently of gear 130 for purposes of fine adjustment of the film or for any other desired purpose, the operator presses downwardly upon cap 147 or grips coupling member 144 directly. As a result drive shaft 140 becomes disengaged from drive shaft 141 and the coupling member 144 and drive shaft 141 can now be turned directly by rotating coupling member 144. As soon as the operator releases member 144, the coupling will be restored by the action of spring 146.

In order to transport the film vertically past the projecting means, the film transport assembly 129 is duplicated, as can best be seen from FIG. 3 in horizontal position. The corresponding components of the transport assembly are designated by the same numerals, but primed. The rotation of drive shaft 140' of this second transport assembly may also be derived from gear 50 through bevel gear 131. A film guide such as shown in FIG. 22 is inserted in an appropriately located slot at the top of projector casing 30. The sound reproduction and the control of the film transport by the tape movement described for the horizontal film movement are not provided for the vertical movement of the film through the projector. As is evident, however, the projector can also be readily designed for vertical film transport with sound reproduction and control by the tape movement.

*Film Transport Control Means*

As previously explained, each picture on the strip film must be projected simultaneously with a corresponding part of the message recorded on the tape, or in other words, each picture must be associated with the reproduction of a definite section of the tape and the film must be transported to bring the next succeeding picture into position for projection when the reproduction from the respective section of the tape is completed. The end of each tape section is marked on the tape by a signal. Various kinds of such tape marking signals are known. There are known and may be used for the purposes of the invention, magnetic or electrically conductive signals, or markings directly on the tape such as notches or holes. For purposes of illustration and because holes in the tape permit a simple and convenient arrangement, signals in the form of holes 150 are used.

As was previously described, gear 50 from which the drive for sprockets 128 is derived, is in mesh with gear 49. This gear is mounted coaxial with fly wheel 47, but independently rotatable of the same. Fly wheel 47 is continuously rotated by motor 43 when the projector is in use. Accordingly, the coupling of fly wheel 47 and gear 49 will effect a transport of the film while and when such coupling is in effect.

The coupling and its control will now be described in detail in connection with FIGS. 14 through 20 and the other figures to the extent that they are pertinent.

Shaft 48 on which fly wheel 47 is rotatable, is fixedly secured in a frame structure 151 which in turn is suitably secured to the top wall of base 32 as can best be seen in FIG. 1. Shaft 48 also seats loose gear 49 in mesh with gear 50, shaft 133 of which is rotatably mounted in frame structure 151 and protrudes from base 32 as also shown in FIG. 1.

Shaft 48 further seats a springy control arm 152 which is loose on the shaft, but secured to gear 49 for rotation in unison with the gear. Accordingly, rotation of arm 152 will be transmitted to gear 49.

Referring now to FIGS. 19 and 20 which show the operation of the transport control in a simplified manner, it is shown in these figures that arm 152 may be longitudinally flexed about its axis of rotation, but is biassed to its straight configuration. The arm is shown flexed in FIG. 19 and straight in FIG. 20. When the arm is straight a lug 153 on fly wheel 47 will engage the arm, thereby carrying the arm along. However, when the arm is flexed, the lug will clear the arm so that the rotation of fly wheel will have no effect upon the position of the arm. In FIG. 19 the arm is flexed at both ends by arm retaining means 154 and 155. The retaining means 154 are fixed in position through flexible, but the retaining means 155 are movable into and out of engagement with the respective arm end. The withdrawal of the retaining means 155 is controlled by the tape signals as will be more fully explained hereinafter.

Let it be assumed that the arm is in the position of FIG. 19 in which lug 153 can freely rotate below the arm. Let it also be assumed that retaining means 155 is withdrawn. As a result, the respective end of the arm is moved into its straight position and lug 153 revolving in the direction indicated by the arrow will engage and carry along the arm away from retaining means 154. Fig. 20 shows the arm engaged and being revolved. Let it finally be assumed that the retaining means 155, immediately after being released, has returned into the retaining position of FIG. 19. Accordingly, the arm after having rotated through 180° will again engage at both its ends retaining means 154 and 155. As a result, the arm will be flexed out of engagement with lug 153 and hence come to a stop. The distance of transport which is transmitted through gear 50 to the film by a rotation of arm 152 through an angle of 180° is so selected that the next succeeding picture area will be moved into the position for projection.

Reverting now to the detail FIGURES 14 through 18, the arm has preferably the configuration best shown in FIG. 14 to make it as light and springy as possible, but any other suitable configuration may also be selected. At both ends of the arm there are mounted protrusions 156 with which the arm engages the retaining means 154 and 155.

Retaining means 154 comprise an elongated plate 157 secured to an extension of frame structure 151. The plate is secured to the frame structure by means of screws 158 and preferably elongated slots 159 to adjust within a limited range the position of the retaining means relative to the rotational path of arm 152. A springy strip 160 is secured to plate 157 on the side thereof facing the arm. This strip is preferably curved as shown in FIG. 18 so that the end of the strip nearest to the approach of the arm is the closest to the plane of fly wheel 47 to facilitate stopping of the arm and the far end of strip 160 as seen in the rotational direction of the arm is again downwardly deflected to aid a smooth departure of the arm from the strip. Retaining means 155 comprise the retaining member 161 as can best be seen in FIG. 17. This member is turned sharply upwardly at 161a to provide a positive stop for the arm 152, or more specifically its extension 156 and is slightly upwardly curved at its opposite end 161b to provide a cradle for the rounded extension 156 which approximately matches the rounding of the extension. The purpose of rounding 161b is to prevent hunting of the arm before its final stop position and bouncing back from extension 161a. Obviously any appreciable departure of the arm from the intended stop position would adversely affect the registry of a picture area with a film gate. The arm is guided upon stop member 161 by means of a slanted surface 162 which is formed on a frame structure 163. This frame structure which is secured to the main frame structure 151 by any suitable means such as screws 164 also provides a guide for a mounting plate 165 for retaining member 161. Mounting plate 165 is in turn secured to a plunger 166 by means of a pivotal connection best shown in FIG. 15. A spring 167 urges mounting plate 165 and with it retaining member 161 toward the retaining position of FIG. 19. The function of the device shown in detail in FIGS. 14 through 18 will be evident from the description of the schematic FIGURES 19 and 20 in which functionally the same components are shown in a simplified manner.

Plunger 166 is controlled by the energization of a solenoid coil 170 which energization in turn is controlled by the tape position as signified by holes 150. Each of the holes is utilized to control the switch means shown in detail in FIGS. 9 and 13.

The switch means comprise as one switch contact a metal roller 171 the middle portion of which is circumferentially recessed to form a guide for tape 63. The other switch contact of the switch means is formed by two fingers 172 and 173. Finger 172 is in continuous sliding contact engagement with the circumference of contact roller 171 in the manner of a slip ring contact whereas finger 173 probes the continuity of the tape material. When one of the holes 150 moves into registry with finger 173 this finger engages the body of roller 171, whereby fingers 172 and 173 are interconnected. This connection completes an energizing circuit for solenoid coil 170 through wires 174 and a suitable source of current as indicated in FIG. 21.

Figure 9:
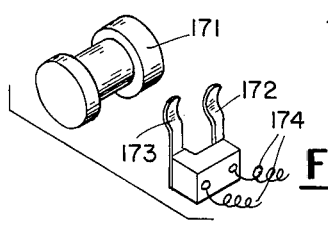
FIG. 9 is a perspective view along line 9—9 of FIG. 7 on an enlarged scale, showing part of the film transport control means controlled by the tape in the non-operated position of the tape drive means.

As is evident, each closing of the switch means of FIGS. 9 and 13 signifies the completion of the message part pertaining to the picture being projected and initiates the movement of the transport control means described in connection with FIGS. 14 through 29.

*Projector Control Means at the End of a Presentation*

The projector further includes means for automatically stopping the movement of the tape and with it the further transport of the film at the completion of a presentation, that is, when all the pictures included in the presentation have been projected and the entire message associated with the pictures has been reproduced. These stop means are controlled by the position of the strip film 117 which is provided for this purpose with a suitable signal producing marking. This marking may again be a marking which produces a magnetic or electric signal, or a marking which physically coacts with a controlled element. Such latter kind of marking is shown in FIG. 10 in the form of a marginal notch 175. A probe element 176 which constitutes the actuating member of a miniature switch 177 such as known under the trade name Microswitch, probes the respective longitudinal edge of film 117 and when it engages notch 175 it moves into the position indicated in FIG. 10 in dotted lines, thereby causing tripping of switch 177. This switch closes an energizing circuit for solenoid 109 as is more fully apparent from FIG. 21. As previously described, energization of solenoid 109 releases link 92 and with it idler 62 for return from the position of FIGS. 11 and 12 into the position of FIGS. 7 and 8 thus stopping further drive of tape 63 by capstan 61.

As is evident from the previous description the tape drive can be reactivated by operating lever 95. To prevent such reactivation before the film is rewound or another film and tape are readied for a new presentation, an extension 178 on plate 80 engages a second actuating member 179 of switch 177 when lever 95 is in the rest or non-operated position of FIG. 8. Operation of actuating member 179 sets switch 177 in its position closing the energizing circuit of solenoid 109 once it has been operated by engagement of actuating member 176 with notch 175. Accordingly, the tape cannot be restarted by operating lever 95 until a new film 117 has been inserted or the film has been rewound so that actuating member 176 of the switch is returned into the position reopening the switch. Setting of a miniature switch by a second actuating member 179 is well known as such in the art and a detailed showing of such an arrangement is not believed to be essential for the understanding of the invention.

*Operation of the Projector*

The operation of the projector will be generally apparent from the previous description and will become further apparent from a review of the diagram of FIG. 21. Components corresponding in function to components shown in the previously described detail figures have been designated by the same reference numerals even though the pictorial representation in FIG. 21 may be somewhat different. In the diagram of FIG. 21 it is assumed that the tape cartridge and the film cartridge are inserted in the projector and that the drive motors 43 and 55 are started. Accordingly, capstan 61 and fly wheel 47 will continuously rotate. Idler 62 coacting with the capstan is shown in the non-drive position of FIGS. 7 and 8. To start the tape drive, idler 62 is moved into the driving position in which it is locked by locking element 101. When now a hole 150 in tape 63 moves into registry with contact finger 173 an energizing circuit for solenoid 170 is completed through contact finger 173, contact roller 171 and contact finger 172. As a result, arm 152 is released and moves the film through sprocket gears 128 until stopped after a rotation through an angle of 180°, thereby moving the next succeeding picture area into the position for projection. This cycle repeats itself until control element 176 engages film notch 175 signifying the end of a presentation. Engagement of element 176 with notch 175 closes switch 177 thereby completing an energizing circuit for solenoid 109. As a result, idler 62 returns into its non-driving position thereby stopping the tape and through it the film transport. The figure further shows that extension 178 prevents a reopening of switch 177 as long as element 176 engages notch 175. Until the notch is removed from engagement with element 176 by rewinding the film, any attempt to restart the tape will automatically result in a tripping of plate 81 which supports idler 62.

*Tilting of the Projector*

Figure 24:
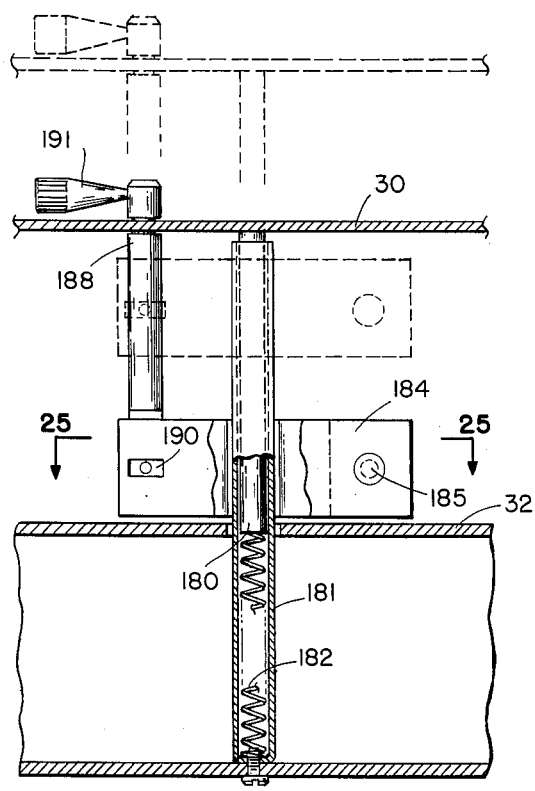
FIG. 24 shows an adjustable mounting or standard for adjusting the height of the projector relative to its base.
Figure 25:
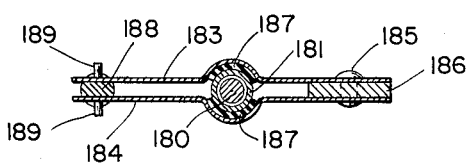
FIG. 25 is a section taken on line 25—25 of FIG. 24.

FIGS. 24 and 25 show an adjustable mounting for conveniently varying the height of the projector casing 30 relative to the base casing 32 and hence relative to the base upon which the entire projector may be placed. Such adjustment in height is often useful to direct the projected picture upon a projection screen or a wall surface serving as screen.

According to FIGS. 24 and 25 the projector casing 30 is mounted on a guide rod 180 which is telescoped in an outer tube 181 which in turn is secured to base casing 32. A loaded spring 182 urges rod 180 and with it the projector toward the position of maximum height. The two telescoped parts are held in any selected axial position relative to each other by two springy clamping arms 183 and 184. These two arms are fixedly secured to each other at one end by rivets 185 suitably spaced by a spacer insert 186. They preferably engage the telescoped parts by means of inserts 187 of high friction material. A spacer bar 188 is fitted between the other ends of the two arms. This spacer is locked to casing 30 by means of a transverse bore through the spacer bar as shown in FIG. 24. The spacer bar is also locked to arms 183 and 184 by means of pins 189 which extend through elongated slots 190 in the arms. The thickness of the spacer is such that it does not interfere with the clamping pressure exerted upon tube 181 by the springiness of the arms. In order to release the clamping pressure, the spacer bar can be twisted within the arms by means of a handle 191. Release of the clamping pressure frees spring 182. As a result, arms 183 and 184 will be lifted and with them the projector, due to the coupling of the spacer bar to casing 30. When handle 191 is released the clamping pressure will be restored. Accordingly, the projector will remain in any rest position selected by the operator. If desired, the tension of spring 182 may be just sufficient to compensate for the weight of the projector, so that the arms can be raised without effort.

While the invention has been described in detail with respect to a certain now preferred example and embodiment of the invention, it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A film transport control assembly of a sound projector for projecting successive frames of still photographs on film and reproducing intelligence recorded on a separate sound carrier of the kind wherein transport means transport the film frame by frame and the activation of the transport means is controlled by a signal from the sound carrier upon completion of a predetermined reproduction of intelligence, said control assembly comprising releasable coupling means included in said transport means, said coupling means comprising a continuously driven rotary driving member and a rotary driven member, said latter member being a flexible member biased into engagement with said driving member, rotation of said driven member by said driving member effecting transport of the film, stop means movable into a stationary position in the rotational path of the driven member to engage the same, engagement of the stop means with the driven member causing flexing of the latter against its bias out of engagement with the driving member and withdrawal of the stop means from said position in the rotational path releasing the driven member for flexing due to its bias into re-engagement with the driving member, and electrically activated release means withdrawing when activated said stop means from said rotational path, said release means being arranged to be temporarily included in an energizing circuit by a signal from the sound carrier thereby activating the release means, the travel of the driven member between release and reengagement effecting transport of the film through a predetermined distance.

2. A control assembly according to claim 1 wherein said flexible driven member comprises a rotatable springy arm mounted freely rotatable coaxially with said driving member and flexed into coupling engagement with said driving member for rotation in unison therewith, said stop means comprising a movable stop member biased into the rotational path of said arm to engage the same and temporarily retractable therefrom by activation of the release means.

3. A control assembly according to claim 2 wherein said springy arm and said stop member have complementary portions engaging each other when said arm engages the stop member to prevent hunting of the arm about its final position.

4. A control assembly according to claim 1 and further comprising a guide means stationarily mounted adjacent to said stop means and slidably engaged by the driven member approaching the stop means, said guide means guiding the driven member out of engagement with the driving member and into abutment with the stop means.

5. A control assembly according to claim 1 wherein said driving member comprises a continuously driven disc having a drive pin protruding from one of its faces, said drive pin being engageable with said driven member.

6. A film transport control assembly of a sound projector for projecting successive frames of still photographs on film and reproducing intelligence recorded on a separate sound carrier of the kind wherein transport means transport the film frame by frame and the activation of the transport means is controlled by a signal from the sound carrier upon completion of a predetermined reproduction of intelligence, said control assembly comprising a continuously driven capstan, an idler, a movable member supporting said idler, said movable member being movable between an operated position in which said idler is in driving relationship with said capstan and a rest position in which said idler is separated therefrom, said movable member being biased into said rest position, actuating means for moving said movable member into said operated position, releasable self-locking retaining means coacting with the movable member and self-locking in a position for retaining the movable member in said operated position, and release means for releasing said retaining means to free the movable member for return into the rest position due to its bias, said release means comprising solenoid means connected to an energizing circuit including switch means controlled by said signal on the sound carrier.

7. A control assembly according to claim 6 wherein said release means further comprises second solenoid means coacting with said self-locking means for releasing the same from the locked position when energized, and an energizing circuit for the second solenoid means including normally open control switch means, said control switch means being closed to complete said energizing circuit for the solenoid means by engagement with a predetermined portion of said film.

8. A control assembly according to claim 7 and further comprising safety switch means included in said energizing circuit for the solenoid means, said safety switch means comprising a movable switch contact feeling said film while being transported and opening said safety switch means when and while engaging said predetermined portion of said film.

References Cited in the file of this patent
UNITED STATES PATENTS

| | | |
|---|---|---|
| 2,136,209 | Finch | Nov. 8, 1938 |
| 2,279,119 | Freimann | Apr. 7, 1942 |
| 2,475,439 | Waller et al. | July 5, 1949 |
| 2,575,203 | Wolfner | Nov. 13, 1951 |
| 2,699,089 | Jakobs et al. | Jan. 11, 1955 |
| 2,853,923 | Daniels | Sept. 30, 1958 |